H. C. AYDELOTT.
Harvester Cutter.
No. 106,305.  Patented Aug. 16, 1870.
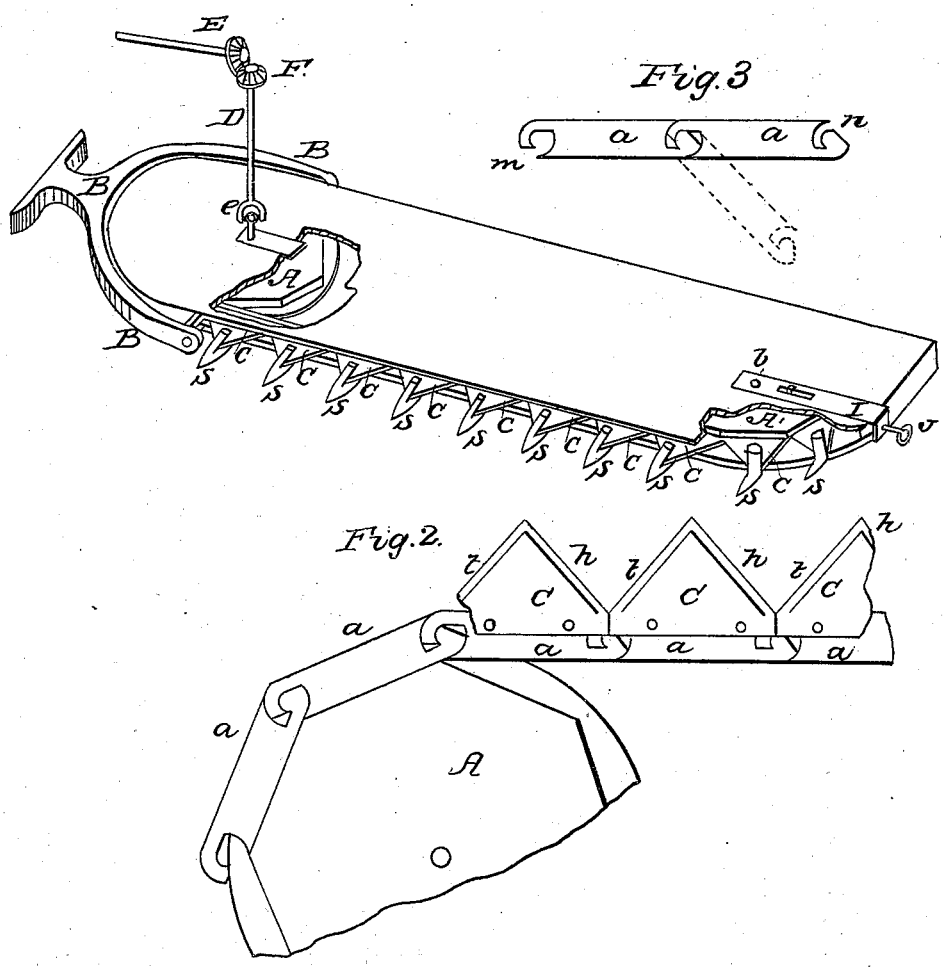

UNITED STATES PATENT OFFICE.

HENRY C. AYDELOTT, OF CARTHAGE, INDIANA.

IMPROVEMENT IN CUTTING APPARATUS FOR HARVESTERS.

Specification forming part of Letters Patent No. 106,305, dated August 16, 1870.

*To all whom it may concern:*

Be it known that I, HENRY C. AYDELOTT, of Carthage, Indiana, have invented a new and useful Improvement in Harvesters, of which the following is a complete specification, reference being had to the accompanying drawing.

My invention relates to the peculiar manner of constructing an endless chain, to which the cutters are attached.

The endless chain has the advantage of being simple in construction, durable, and its sections or links easily taken apart or put together. The links or sections composing the chain are lettered $a$, two of which are represented in a straight line in Figure 3.

In the accompanying example the links are so formed as to be flexible only in one direction from a straight line, as shown by the two links and dotted lines, Fig. 3.

As the least expensive method of constructing the chain, the links are cast with the peculiar hooks or notches at their ends, substantially as shown in the drawing. The notches at the opposite ends of a link differ one from another. The links all have the same peculiarities, the notch $n$ of one link fitting the hook $m$ of another. The said notches or hooks are so shaped as to admit of the links being connected or taken apart only by a side movement thereof, so that the cutters, when attached to the chain, with their end overlapping the joints, serve to secure the links together.

The cutters C, as shown in Fig. 2, are attached, one to each link, being secured by screws or rivets. The contiguous or adjacent ends of the cutters centrally overlap the joints of the chain, by reason of which, as evident from the drawing, the flexibility of the chain is not interfered with, and the links are held together. The cutters are operated within a double platform, as shown in Fig. 1, portions of the upper part of which are represented broken away to show the mechanism.

The endless chain and cutters are carried on flanged annular pulleys A and A', the distance between angles of said pulleys corresponding to the distance between the angles of the bent chain, thus insuring the operation of said chain when the pulleys are put in motion.

In Fig. 2 a part of one of the angular pulleys is represented, as is also a portion of the chain, in some of the links of which latter cutters are shown, and with others omitted, the omission of the cutters being for the purpose of giving a better view of the joints of the chain and its connection with the pulley. The distance between the upper and lower parts of the platform is sufficient only to give the pulleys and the chain and cutters easy play between them.

A bar, to which the fingers S are attached, is located on the front edge of the under part of the platform, in which the cutters and chain slide as they pass in front. Motion is imparted to the cutters by means of the shafts D and E, which connect the pulley A with the driving-gearing of the machine.

The upright shaft D is connected with the journal of pulley A, and is connected with shaft E by the bevel-gear F.

The end of the platform attached to the machine is pivoted within the jaw B, which latter is bolted to the side of the machine, thus allowing the said platform the necessary vertical play to accommodate it to the unevenness of the ground, and also allowing it to be elevated for transportation. The pivots by which the jaw B and platform are connected are on a line at right angles to the length of said platform, and through the journal of pulley A, by reason of which shaft D, which is provided with a universal joint, $e$, admits of the vertical play of the platform.

The cutters are serrated on one edge, $h$, while the other edge $t$ is smooth, as shown in Fig. 2, and are designed to revolve in one direction as a reaper and in the opposite direction as a mower.

The shaft E is geared with the driving mechanism so as to be shifted, and the direction of its motion reversed for driving the cutters either way, one plan of doing this being by means of a pinion or pinions on shaft E, which, with the latter, may be shifted between outer and inner toothed wheels, the latter wheel being the largest for driving the cutters as a mower, and both being suitably proportioned in size for their respective purposes.

The journals b of pulley A' have bearings in the adjustable strap I, which latter is operated by means of a thumb-screw, J, for tightening or loosening the chain.

The platform is provided with caster-wheel, shoes, &c., as in the usual manner.

Having thus fully described my said invention, what I claim, and desire to secure by Letters Patent, is—

The endless chain for harvester-cutters, composed of the sections or links a, connected by joint m n, constructed substantially as set forth.

HENRY C. AYDELOTT.

Witnesses:
 JOSEPH RIDGE,
 W. A. MOTE.